(12) United States Patent
Szabo

(10) Patent No.: US 6,520,546 B2
(45) Date of Patent: Feb. 18, 2003

(54) QUICK CONNECTOR RELEASE TOOL

(75) Inventor: George Szabo, Ortonville, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 58 days.

(21) Appl. No.: 09/748,964

(22) Filed: Dec. 27, 2000

(65) Prior Publication Data

US 2002/0079696 A1 Jun. 27, 2002

(51) Int. Cl.$^7$ ............................................... F16L 37/00
(52) U.S. Cl. ..................... 285/308; 285/319; 285/921
(58) Field of Search .................... 285/39, 319, 921, 285/308, 305

(56) References Cited

U.S. PATENT DOCUMENTS

| | | | | |
|---|---|---|---|---|
| 4,913,467 A | * | 4/1990 | Washizu | 285/39 |
| 4,946,205 A | * | 8/1990 | Washizu | 285/319 |
| 5,084,954 A | | 2/1992 | Klinger | 29/237 |
| 5,187,851 A | | 2/1993 | Klinger | 29/237 |
| 5,219,188 A | * | 6/1993 | Abe et al. | 285/319 X |
| 5,226,230 A | | 7/1993 | Klinger | 29/237 |
| 5,378,025 A | | 1/1995 | Szabo | 285/39 |
| 5,542,716 A | | 8/1996 | Szabo et al. | 285/305 |
| 5,730,481 A | | 3/1998 | Szabo et al. | 285/305 |
| 5,782,502 A | | 7/1998 | Lewis | 285/87 |
| 5,863,077 A | | 1/1999 | Szabo et al. | 285/3 |
| 5,882,049 A | | 3/1999 | Beans | 285/321 |
| 5,951,063 A | | 9/1999 | Szabo | 285/303 |

\* cited by examiner

Primary Examiner—Lynne H. Browne
Assistant Examiner—David E. Bochna
(74) Attorney, Agent, or Firm—Young & Basile, P.C.

(57) ABSTRACT

A release tool for a quick connector with a radially displaceable retainer has a pair of arms extending from a collar which are normally disposed on axially extending surfaces of the housing of the female component of the quick connector when the release tool is mounted on the housing. A retainer engaging surface on each of the arms is movably engageable with projections on side legs of the retainer to urge the projections and the end portions of the side legs of the retainer radially inward to a position where the projections are disengaged from lock edges on the axially extending surfaces of the housing to allow disengagement of the retainer element from the male component of the quick connector.

10 Claims, 4 Drawing Sheets

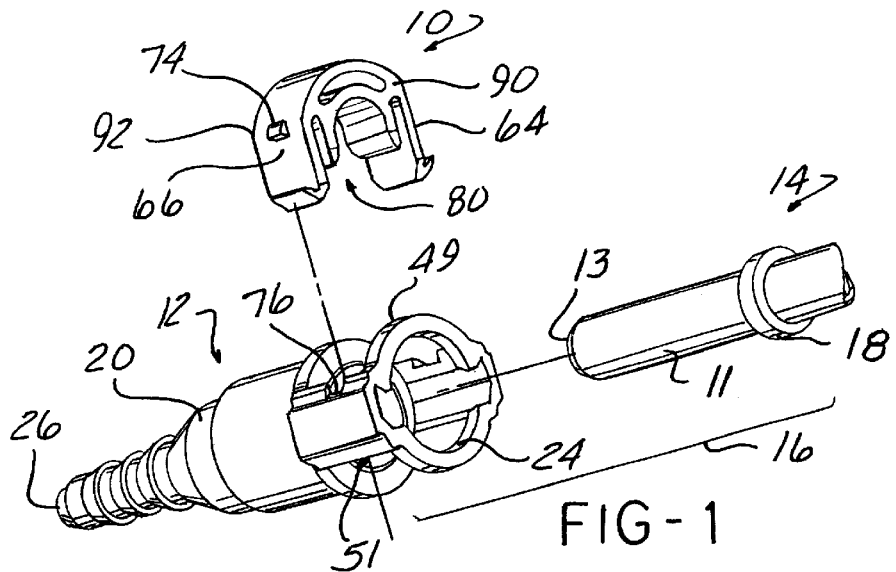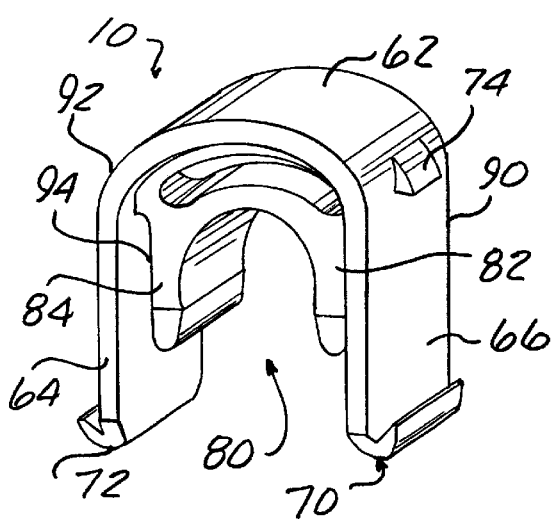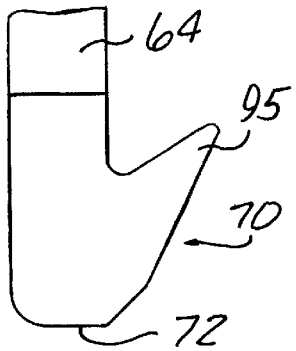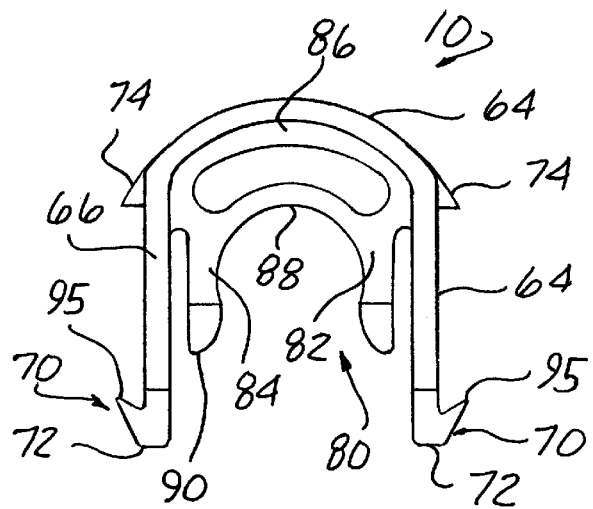

QUICK CONNECTOR RELEASE TOOL

BACKGROUND

1. Field of the Invention

The present invention relates, in general, to fluid quick connector assemblies which couple male and female connector components and, more specifically, to fluid quick connectors having an internal retainer which locks the male connector component in the female connector component.

2. Description of the Art

Snap-fit or quick connectors are employed in a wide range of applications, particularly, for joining fluid carrying conduits in automotive and industrial application. Such quick connectors utilize retainers or locking elements for securing a male connector component, such as a tubular conduit, within a complimentary bore of a female connector component or housing. Such retainers are typically of either the axially-displaceable or radially-displaceable type. The terms "axially-displaceable" or "radially-displaceable" are taken relative to the axial bore through the female component.

In a typical quick connector with an axially displaceable, metal retainer, the retainer is fixedly mounted within a bore in a housing of the female connector component of housing. The retainer has a plurality of radially and angularly extending legs which extend inwardly toward the axial center line of the bore in the housing. A tube or male component to be sealingly mounted in the bore in the female component includes a radially upset portion or flange which abuts an inner peripheral surface of the retainer legs.

As the male component is inserted through the open end of the female component housing, the flange on the male component engages and deflects the legs of the retainer radially outward until the flange clears the end of the legs, at which time the legs snap radially inward into secure engagement with the flange on the male component to lock the male and female components together and to resist separation or pullout of the male component from the female component.

In order to separate the tubular conduit or male component from the female component, it is necessary to expand the deflectable legs on the retainer in a radially outward direction to enable the enlarged annular flange on the male component to pass by the ends of the legs. Release tools are frequently employed to effect the release of such a quick connector. The release tools are mountable about the portion of the male component or tubular conduit extending outward from the female component housing and urged through the open end of the housing to deflect the retainer legs radially outward thereby enabling the annular flange on the male component to be pulled axially outward from the female component housing.

Certain quick connector designs of this type have a release member which is integrally, slideably mounted on the female component and forms a unitary part of the quick connector. Such release members are forcibly slideable into the female component to engage and radially expand the deflectable legs of the retainer outwardly to enable the enlarged flange on the tubular conduit to be axially removed from the female component.

However, as can be readily imagined, space limitations within a use application, such as a vehicle frequently prevent the use of manual release tools. Further, even quick connectors with integrally mounted release members have a frequent accessibility problem since the end of the release member may not be readily accessible for sliding axial insertion into the housing.

In quick connectors having an axially displaceable retainer, the retainer is slideably insertable through the open end of the female component and snaps in place within the female component; while at the same time being readily separable from the female component when outer end tabs on the retainer are squeezed together. This squeezing action moves angularly extending fingers carried on the retainer radially outward from engagement with the annular flange on the male component to enable the male component and/or the retainer itself to be axially removed the female component housing.

However, while this type of retainer eliminates the need for a manual release tool or a separate release member, quick connectors employing this type of retainer still suffer accessibility problems in the crowded vehicle environment.

Radially displaceable retainers are also known in which the retainer is radially displaceable through aligned bores or apertures formed transversely to the main through bore in the female component housing. The radially displaceable retainer is typically provided with a pair of depending legs which are sized and positioned to slip behind the radially upset portion or flange on the male conduit only when the male connector or conduit is filly seated in the bore in the female component. This ensures a positive locking engagement of the conduit with the female component as well as providing an indication that the conduit is fully seated since the radially displaceable retainer can be fully inserted into the female component only when the conduit has been fully inserted into the bore in the female component.

One type of radially displaceable retainer includes a pair of projections extending along the length of the retainer between opposed side edges of each of the side legs. The projections which are in the form of hooks, snap around edges of a pair of axially extending surfaces formed on the female component housing to lock the retainer to the female component.

Release of such a retainer from the female component is effected by manual, inward squeezing of the projections toward each other until the projections slide inwardly of the axially extending surfaces on the housing to enable the retainer to be radially displaced from the housing thereby allowing separation of the male and female components.

Despite the effectiveness of this last described radially displaceable retainer, a quick connector employing such a radially displaceable retainer still faces accessibility problems during release operation. It is often times difficult for a service person to manually grasp the projections on the retainer and apply sufficient squeezing force to move the projections radially inward a sufficient amount to clear the axial surfaces on the housing thereby allowing the retainer to be radially displaced from the housing.

What is needed is a release tool for a quick connector employing a radially displaceable retainer having side leg projections which snap around axial surfaces on the female component housing to fixedly mount the retainer to the housing. It would also be desirable to provide such a release tool which is easily employable despite crowded and relatively difficult accessibility to the retainer in a use position. It would also be desirable to provide such a release tool which can be releasably, integrally mounted on the quick connector without interfering with the normal operation of the quick connector.

SUMMARY OF THE INVENTION

The present invention is a release tool for a quick connector having a radially displaceable retainer.

In one aspect of the invention, the quick connector combination includes mating male and female components, the male component having a first end portion terminating in a tip end and a radially enlarged annular flange spaced from the tip end. The female component, including a housing, having an axially extending bore extending from one end of the housing for receiving the tip end and the radially enlarged flange on the male component therein.

A pair of opposed, aligned apertures are formed in the housing in transverse communication with the axially extending bore in the housing. The first and second apertures form first and second axially extending surfaces on the housing, the first and second surfaces each having a lock edge.

A retainer is slidable through the pair of apertures in the housing for releasably locking the male and female components together. The retainer includes a body having an end wall and first and second spaced legs extending from the end wall and terminating in outer ends. Outwardly extending projections formed on the first and second legs are releasably engageable with the lock edges of the housing after the retainer is fully inserted into the transverse bore in the housing.

The release tool includes a collar engageable with the end of the housing. A pair of opposed arms project from the collar and are engageable with the axially extending surfaces on the housing when the release tool is mounted on the housing. Each of the arms having a retainer engaging surface which is forcibly engageable with the projections on the retainer to move the projections and the side legs of the retainer radially inward to disengage the projections from the lock edges on the housing allowing movement of the retainer relative to the male component for separation of the male component from the female component.

In one aspect, the collar on the release tool has an aperture alignable with the bore in the housing when the release tool is mounted on the housing.

Preferably, the first and second arms on the release tool are diametrically opposed. Also, the first and second arms of the release tool have an inner surface shaped complimentary to the outer surface of the housing to secure the release tool in a relative fixed position with respect to the housing.

In another aspect, the present invention is the above-described release tool adapted to be mountable on a quick connector having a radially displaceable retainer.

The unique release tool of the present invention is usable with a quick connector having a radially displaceable retainer to simplify disengagement of the retainer from its locked position on the female component housing to enable separation of the male and female components of the quick connector. The release tool is mountable on the housing of the quick connector in a position that does not interfere with the normal insertion or movement of the retainer. More importantly, the release tool of the present invention enables easy disengagement of the retainer element from its locked position despite any crowded mounting conditions of the quick connector.

BRIEF DESCRIPTION OF THE DRAWING

The various features, advantages and other uses of the present invention will become more apparent by referring to the following detailed description and drawing in which:

FIG. 1 is an exploded, perspective view of a quick connector with a snap-on retainer according to the present invention;

FIG. 2 is an enlarged, left end, perspective view of the snap-on retainer shown in FIG. 1;

FIG. 7 is an end, elevation view of the snap-on retainer shown in FIGS. 1 and 2;

FIG. 8 is a partial, enlarged view of one of the hook-like ends of the legs of the retainer;

DETAILED DESCRIPTION

Figure 3:
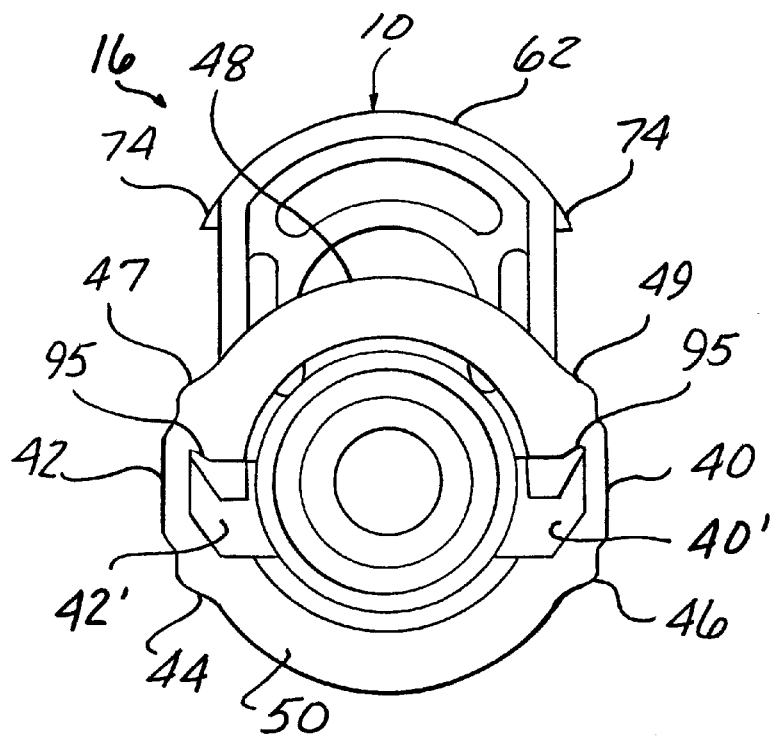
FIG. 3 is an end view of the quick connector and snap-on retainer with the retainer shown in a partially inserted, storage position of the snap-on retainer.

For clarity in understanding the use and operation of the present release tool, reference will first be had to FIGS. 1–9 which depict a snap-on retainer 10 which lockingly couples female and male components 12 and 14, respectively, of a quick connector 16.

The following description of the female connector component or element 12 is by way of example only as the female connector component 12 may have any suitable shape typically found in quick connectors.

Figure 5:
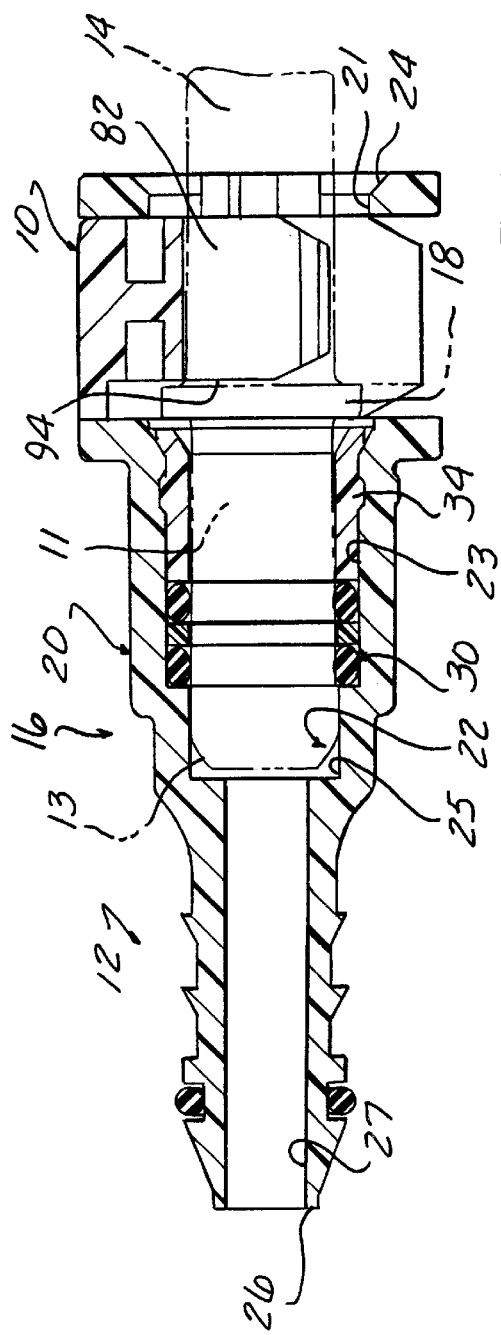
FIG. 5 is a cross sectional view generally taken along line 5—5 in FIG. 4.

The female component includes a housing 20 having an elongated, axially extending, internal stepped bore 22 extending from a large diameter first, open end 24 to a smaller diameter, second open end 26, as shown in detail in FIG. 5. The stepped bore 22 includes a first bore portion 21 extending from an opening at the first end 24 of the housing 20 to a second smaller diameter second stepped bore portion 23. A third yet smaller diameter stepped bore portion 25 extends axially from one end of the second stepped bore portion 23 and communicates to a still smaller fourth stepped bore portion 27 which extends to the open second end 26 of the housing 20.

As is conventional, a top hat or bearing 34 is mounted in the second stepped bore portion 23 immediately adjacent the end of the first bore portion 21. A seal means 30 is also mounted in the second stepped bore portion 23 between one end of the top hat 34 and the third stepped bore portion 25.

The inner diameter of the first stepped bore portion 21 is sized to slidably receive the outer diameter of the radially enlarged flange or upset bead 18 formed on the male component or fitting 14. Further, the inner diameters of the seal means 30 and the top hat 34 are sized to sealingly engage the outer diameter of the end portion 11 of the male component 14 extending from the radially enlarged flange 18 to the tip end 13 of the male component 14. The third stepped bore portion 25 has an inner diameter sized to snugly engage the outer diameter of the end portion 11 of the male component 14 when the male component 14 is fully inserted into the stepped bore 22 as described hereafter.

Figure 4:
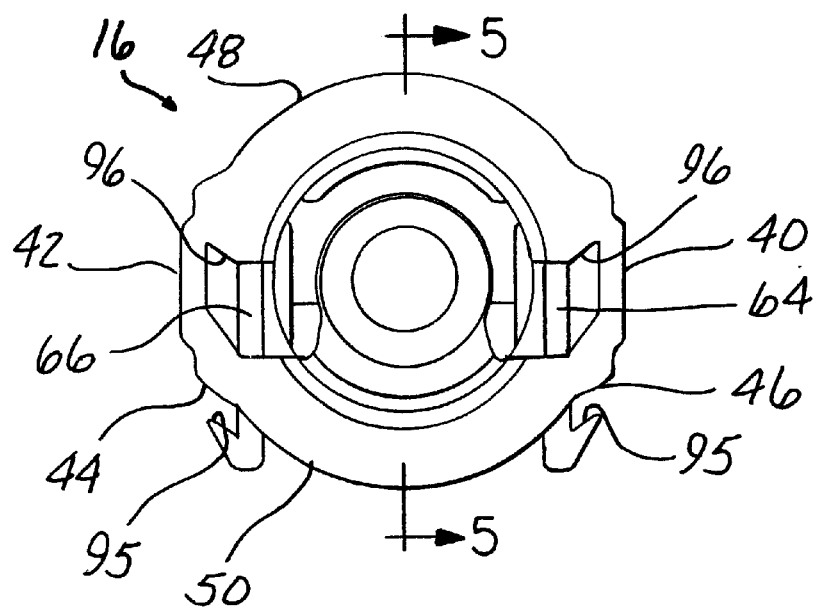
FIG. 4 is an end view of the quick connector and snap-on retainer with the retainer depicted in a fully inserted, position in the female component.

As shown in FIGS. 1, 3, 4 and 6, the first end 24 of the housing 12 is formed with a pair of opposed, exterior flats 40 and 42. The flats 40 and 42 are diametrically opposed on the first end 24 and may be centrally located on each diametrical side of the first end 24. The adjacent surfaces of the housing 20 form an opposed pairs of lock surfaces or flats, such as a first flat 44 and a second flat 46. A second pair of flats 47 and 49 are formed on the other side of the flats 44 and 46. The flats 44 and 46 extend axially a short distance along the first end 24 of the housing 20. The opposed surfaces 48 and 50 of the first end 24 of the housing 20 between the flats 44 and 46 and the flats 47 and 48 have a generally arcuate shape as shown in FIGS. 3 and 4. Apertures 49 and 51 are formed respectively in each surface 48 and 50. The apertures 49 and 51 are aligned to form a transverse bore extending through the first end 24 of the housing 20 which is disposed in communication with the first bore portion 21 in the housing 20.

The retainer 10, described hereafter, is by way of example only as other radially-displaceable retainer designs having side locking projections may also employ the release tool of the present invention.

The retainer 10, shown in FIGS. 1, 2–5, and 7–9, is formed of a one-piece body of a suitable plastic, such as polyketone, for example, and has an end wall 62 formed of a generally curved or arcuate shape, by way of example only, and first and second spaced side legs 64 and 66. The side legs 64 and 66 extend generally parallel to each other from opposite ends of the end wall 62. Further, each side leg 64 and 66 has an outer end 72, although it is possible to connect the side legs 64 and 66 at a lower portion by an arcuate member.

A pair of projections 70 extend along the length of the retainer 10 between opposed side edges of the side legs 64 and 66, respectively. The projections 70 are located adjacent the outer end 72 of each leg 64 and, by example only 66. The projections 70 engage surfaces on the housing 12 to position the retainer 10 in the shipping position shown in FIG. 3, or in the fully inserted, latched position shown in FIGS. 4 and 5.

Further, a pair of outward extending lock tabs or edges 74 are formed adjacent the end wall 62 on each side leg 64 and 66. The lock tabs 74 engage notches 76 in the first end 24 the housing 12 when the retainer 10 is fully inserted in the housing 12. The lock tabs 74 are offset from the center of the length of each of the side legs 62 and 64 so as to be located generally closer to one side end of the retainer 10 than the opposed side end. Similarly, the notches 76 formed in the housing 12 closer to the first end 24 of the housing 12. This provides a visual indication of a proper orientation of the retainer 10 in the housing 12 to insure that the retainer 10 is correctly positioned to lock the male component 14 in the housing 12.

As shown in FIGS. 1, 2, 5 and 7, the retainer 10 includes a radially flange receiving means 80 which is preferably carried as an integral, one-piece part of the retainer 10. The radial flange receiving means 80 includes first and second depending arms 82 and 84 which extend from a boss or enlargement 86 integrally formed on the inner surface of the end wall 62 of the retainer 10. An inverted, U-shaped slot 88 is formed on the inner surfaces of the arms 82 and 84 and the boss 86 which is sized to snugly conform to the outer diameter of the tubular portion 11 of the male component 14. The outer ends 91 of each of the arms 82 and 84 are angled or tapered to act as a guide surface to assist in sliding movement of the arms 82 and 84 over the tubular end 11 of the male component 14.

As shown in FIGS. 1, 2 and 7, each of the arms 82 and 84 extends from one side end contiguous with a first side end 90 of the retainer 10 to an opposed side end which is spaced from a second side end 92 of the retainer 10. This forms a slot or recess 94 within the interior of the legs 64 and 66 of the retainer 10 and the end of the arms 82 and 84. The recess 94, as shown in FIG. 5, is positioned to receive the annular flange 18 on the male component 14 only when the male component 14 is fully inserted into the female component or housing 12. This insures a fully seated, sealed connection between the male component 14 and the female component 12 while completely locking the male component 14 in the housing 12.

As shown in FIGS. 1, 2, 7 and 8, the projections 70 on the legs 64 and 66 of the retainer 10 are uniquely formed with an angled hook-like shape terminating in a tip 95. The tip 95 is disposed at an acute, upturned angle with respect to the corresponding legs 64 or 66.

Figure 6:
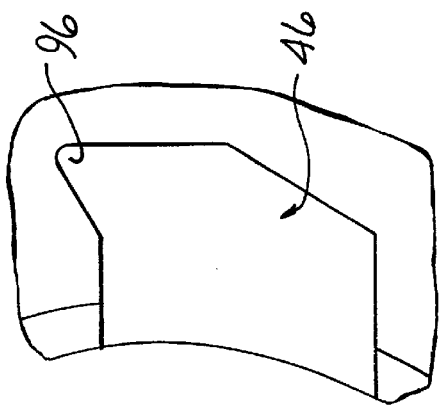
FIG. 6 is a partial, enlarged view of one of the longitudinal grooves formed in the housing of the quick connector shown in FIG. 1.

Similarly, as shown in FIGS. 3 and 4, and in greater detail in FIG. 6, the grooves 40' and 42', such as groove 40', are formed with a recess or notch 96 at one end which is shaped complimentary to the shape of the tip 95 of the projection 70 on each of the legs 64 and 66 of the retainer 10. In this manner, pull out of the retainer 10 from the housing 12 is resisted by the interlocking tips 95 on the legs 64 and 66 of the retainer 10 which are seated within the notches 96 in the grooves 40' and 42' in the housing 12 as shown in the partially inserted position of the retainer 10 in FIG. 3. It should be noted that the outer surface of the housing 12 adjacent the first end 24 is formed with a pair of flats or lock edges 44 and 46 which are disposed at an angle complimentary to the acute angle of the tips 95 on the legs 64 and 66 of the retainer 10. This interlock of the tips 95 with the flats 44 and 46 resists pull out of the retainer 10 from the housing 12.

Figure 9:
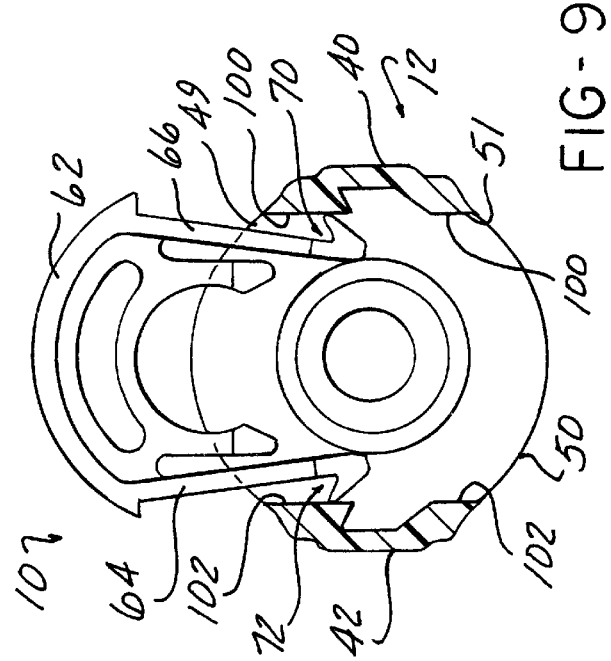
FIG. 9 is a cross section view showing the insertion of the retainer into the housing.

The hook shaped tips 95 on the legs 64 and 66 of the retainer 10 in conjunction with the grooves 40' and 42' in the housing 12 also provide, a distinct, "avalanche effect" snap action of the retainer 10 in the housing 12 as shown in FIG. 9. The grooves 40' and 42' in the housing 12 are formed in generally planar flat surfaces 100 and 102, respectively. The surfaces 102 and 104 force the ends 72 of the legs 64 and 66 laterally inward toward each other when the retainer 10 is inserted into the housing 12. When the tips 95 clear one edge of the grooves 40' and 42', the resilient nature of the legs 64 and 66 snaps the ends 72 and tips 95 laterally outward to create an "avalanche effect" which provides a distinct tactile feedback to the user indicating that the retainer has lockingly engaged the housing 12 in either the partially inserted position shown in FIG. 3 or the fully inserted position shown in FIG. 4. It should be noted that further insertion force on the retainer 10 moving the retainer 10 from the partially inserted position shown in FIG. 3 to the fully inserted position shown in FIG. 4 again causes the end 72 of the legs 64 and 66 to be urged laterally inward when the tips 95 of the legs 64 and 66 slide along the lower portion of the surfaces 100 and 102. When the tips 95 clear the outer end of the surfaces 100 and 102, the legs 64 and 66 spring laterally outward in a distinct "avalanche effect" manner. The lower ends of the grooves 40' and 42' are angled inward to enable the tips 95 to slide out of the grooves 40' and 42'.

The retainer 10 can be first be installed on the housing 12 in a shipping or storage position as shown in FIG. 3. In this position, the projections 70 on the side legs 64 and 66 of the retainer 10 snap into and engage the longitudinally extending groves 40' and 42'.

Further insertion of the retainer 10 through the aligned apertures 49 and 51 in the housing 12 causes the ends 72 of the legs 64 and 66 to pass along the lower portion of the surfaces 100 and 102 until the tips 95 clear the ends of the surfaces 100 and 102 and then snap outward exteriorly of the outer surface of the first end 24 of the housing 12 as shown in FIG. 4. In this fully inserted position of the male component 14 in the female component 12, the annular flange 18 on the male component 14 is situated ahead the legs 64 and 66 on the retainer 10. This position represents the fully latched position in which the male component 14 is fully seated in and lockingly engaged with the female component 12. The full insertion of the retainer 10 into the housing 12 also provides visible indication of the fully locked connection of the male and female components 14 and 12, respectively.

It should be noted that if the male component 14 is not fully engaged or seated within the housing 12, the annular flange 18 on the male component 14 will not be properly situated within the transverse bore in the housing 12 to slidably receive the recess 94 in the retainer 10. If the annular flange 18 on the male component 14 is at any position other than shown in phantom in FIG. 5, the arms 82 and 84 on the retainer 10 will contact the annular flange 18. Since the spacing between the inner surfaces of the legs 82 and 84 is less than the outer diameter of the annular flange 18, the retainer 10 cannot be moved to the fully inserted position thereby providing an indication of an incomplete seating or mounting of the tip 11 of the male component 14 in the housing 12.

Figure 10:
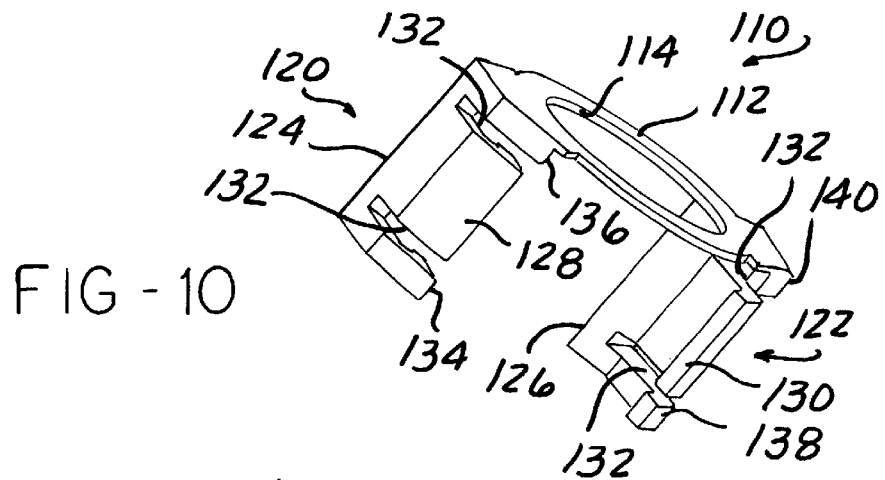
FIG. 10 is a perspective view of a quick connector release tool according to the present invention.
Figure 11:
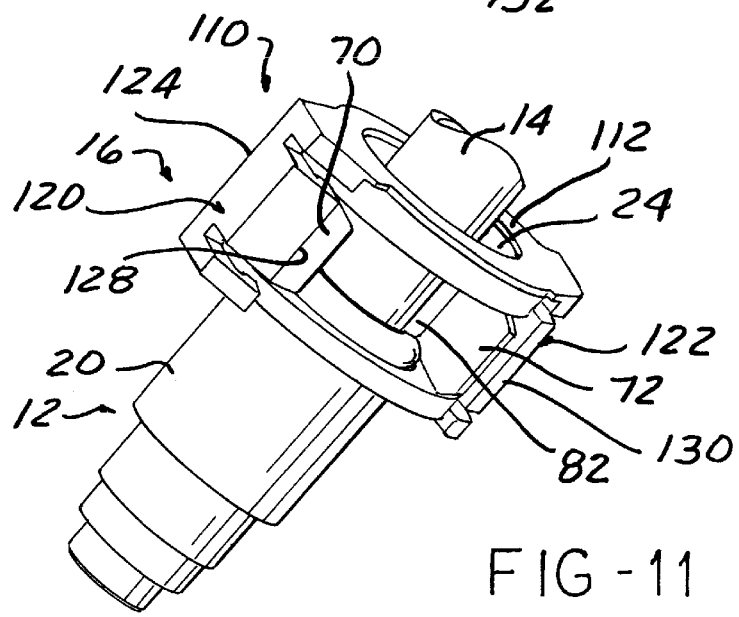
FIG. 11 is a perspective view of the release tool shown in FIG. 10 mounted on the quick connector shown in FIGS. 1–9.
Figure 12:
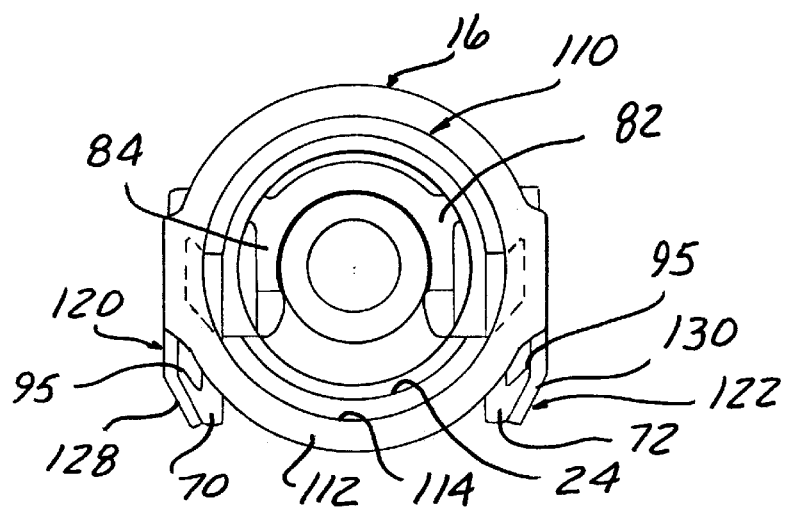
FIG. 12 is an end view of the release tool mounted on the quick connector shown in FIG. 11.

The release tool 110 of the present invention is depicted in FIGS. 10, 11 and 12. The release tool 110 includes a generally annular collar 112 having an aperture 114 sized to have the same or larger inner diameter than the diameter of the bore extending through the first end 24 of the housing 20 of the female component 12.

An arm 120 and 122 is cantilevered from each side of the collar 112, respectively. Each arm 120 and 122 has a generally angled or arcuate cross-section extending from a first side end 124 and 126, respectively, to an opposed retainer engaging side end 128 and 130, respectively. As shown in FIGS. 10 and 11, each arm 120 and 122 has a pair of slots 132 extending through the retainer engaging side ends 128 and 130, respectively. The slots 132 form two outer surfaces 134 and 136 in the arm 120 and outer surfaces 138 and 140 in the arm 122.

The release tool 110 is adapted to be slideably urged over the exterior of the housing 20, until the collar 112 engages the end of the housing 20 and the arms 120 and 122 are substantially aligned with the axial surfaces or flats 42 and 40 in the housing 20 as shown in FIGS. 11 and 12. This substantially aligns the openings between the spaced edges of the arms 120 and 122 with the apertures 49 and 51 in the housing 20 for normal insertion of the retainer 10 therethrough as described above.

FIGS. 11 and 12 depict the mounted position of the release tool 10 as well as the fully engaged, locked position of the retainer 10 in the housing 20 forcibly holding the male component 14 in the housing 20. In this mounted position, the retainer engaging surfaces 128 and 130 of the release tool 110 are disposed in close proximity to or in substantial overlying engagement with the tips 95 of the projections 170 on the side legs 64 and 66 of the retainer 10.

When it is desired to disengage the retainer 10 from the housing 20 to allow separation of the male component 14 from the female component 12, a user grasps the arms 120 and 122 on the release tool 110 and exerts an inward squeezing force on the arms 120 and 122 which has the effect of bending the arms 120 and 122 radially inward bringing the retainer engaging surfaces 128 and 130 toward each other. During this movement of the retainer engaging surfaces 128 and 130 on the arms 120 and 122, respectively, the retainer engaging surfaces 128 and 130 will engage the tips 95 of the projections 70 on the retainer 10 and forcibly urge the projections 70 toward each other until the tips 95 clear the inner edge of the axial surfaces or flats 40 and 42. At this time, the retainer 10 is capable of radial movement relative to the housing 20 of the female component 10, such as to the storage position shown in FIG. 3 thereby allowing the male component 14 to be axially disengaged from the female component 12.

It should be noted that when the retainer 10 has been moved to the storage position, the user simply discontinues the application of force to the arms 120 and 122 of the release tool 110 thereby enabling the release tool 110 to remain in position on the housing 20.

In summary, there has been disclosed a unique release tool for a quick connector having a radially displaceable retainer which provides an expeditious means for disengaging the retainer from the locked position. The release tool is easily usable in crowded mounting positions of the retainer and quick connector. Further, the release tool can be integrally mounted on the quick connector in an operative position without interfering with the normal insertion of the retainer into the female component housing.

What is claimed is:

1. In combination, a quick connector and release tool comprising:

mating male and female components;

the male component having a first end portion terminating in a tip end and a radially enlarged annular flange spaced from the tip end;

the female component including a housing having an axially extending bore extending from one end of the housing for receiving the tip end and the radially enlarged flange on the male component;

a pair of opposed, aligned apertures formed in the housing in transverse communication with the axially extending bore in the housing;

first and second axially extending surfaces formed in the housing between the first and second apertures, the first and second axially extending surfaces each having a lock edge;

a retainer slidable through the pair of apertures in the housing for releasably locking the male and female components together, the retainer including a body having an end wall and first and second spaced side legs extending from the end wall and terminating in outer ends;

outwardly extending projections formed on the first and second side legs releasably engageable with the lock edges of the housing after the retainer is fully inserted into the transverse bore in the housing;

the release tool including a collar engageable with the one end of the housing;

a pair of opposed arms projecting from the collar and engageable with the axially extending surfaces on the housing when the release tool is mounted on the housing; and each of the arms having a retainer engaging surface nominally radially spaced from the projections on the retainer and engageable with the projections on the retainer upon radially inward movement of the arms to move the projections on the side legs of the retainer radially inward to disengage the projections from the lock edges on the housing allowing movement of the retainer relative to the male component for separation of the male component and the female component.

2. The combination of claim 1 wherein:

the collar on the release tool has an aperture alignable with the axially extendible bore in the housing when the release tool is mounted on the housing.

3. The combination of claim 1 wherein:

the first and second arms on the release tool are diametrically opposed.

4. The combination of claim 1 wherein:

the first and second arms of the release tool have an inner surface shaped complimentary to an outer surface of the housing to mount the release tool in a substantially fixed position with respect to the housing.

5. The release tool of claim 1 wherein:

the first and second arms are diametrically opposed.

6. The release tool of claim 1 wherein:
the first and second arms of the release tool have an inner surface shaped complimentary to an outer surface of the housing to mount the release tool in a substantially fixed position with respect to the housing.

7. A release tool for a quick connector having mating male and female components, the male component having a first end portion terminating in a tip end and a radially enlarged annular flange spaced from the tip end, the female component including a housing having an axially extending bore extending from one end of the housing for receiving the tip end and the radially enlarged flange on the male component, a pair of opposed, aligned apertures formed in the housing in transverse communication with the axially extending bore in the housing, first and second axially extending surfaces formed in the housing between the first and second apertures, the first and second axially extending surfaces each having a lock edge, a retainer slidable through the pair of apertures in the housing for releasably locking the male and female components together, the retainer including a body having an end wall and first and second spaced side legs extending from the end wall and terminating in outer ends, outwardly extending projections formed on the first and second side legs releasably engageable with the lock edges of the housing after the retainer is fully inserted into the transverse bore in the housing, the release tool comprising:

a collar adapted to be engageable with the end of the housing;

a pair of opposed arms projecting from the collar and adapted to be engageable with the axially extending surfaces on the housing when the release tool is mounted on the housing; and each of the arms having a retainer engaging surface which is adapted to be engageable with the projections on the retainer upon radially inward movement of the arms to move the projections on the side legs of the retainer radially inward to disengage the projections from the lock edges on the housing allowing movement of the retainer relative to the male component for separation of the male component and the female component.

8. The release tool of claim 7 wherein:
the collar on the release tool has an aperture adapted to be alignable with the axially extendible bore in the housing when the release tool is mounted on the housing.

9. In combination, carried on the housing a quick connector and release tool comprising:

mating male and female components;

the male component having a first end portion terminating in a tip end and a radially enlarged annular flange spaced from the tip end;

the female component including a housing having an axially extending bore extending from one end of the housing for receiving the tip end and the radially enlarged flange on the male component;

a pair of opposed, aligned apertures formed in the housing in transverse communication with the axially extending bore in the housing;

first and second axially extending surfaces formed in the housing between the first and second apertures, the first and second axially extending surfaces each having a lock edge;

a retainer slidable through the pair of apertures in the housing for releasably locking the male and female components together, the retainer including a body having an end wall and first and second spaced side legs extending from the end wall and terminating in outer ends;

outwardly extending projections formed on the first and second side legs releasably engageable with the lock edges of the housing after the retainer is fully inserted into the transverse bore in the housing before and after insertion of the male component into the housing;

the release tool carried on the housing and including a collar engageable with the end of the housing before and after of insertion of the male component in to the housing;

a pair of opposed arms projecting from the collar and engageable with the axially extending surfaces on the housing when the release tool is mounted on the housing; and each of the arms having a retainer engaging surface which is engageable with the projections on the retainer upon radially inward movement of the arms to move the projections on the side legs of the retainer radially inward to disengage the projections from the lock edges on the housing allowing movement of the retainer relative to the male component for separation of the male component and the female component.

10. A release tool for a quick connector having mating male and female components, the male component having a first end portion terminating in a tip end and a radially enlarged annular flange spaced from the tip end, the female component including a housing having an axially extending bore extending from one end of the housing for receiving the tip end and the radially enlarged flange on the male component, a pair of opposed, aligned apertures formed in the housing in transverse communication with the axially extending bore in the housing, first and second axially extending surfaces formed in the housing between the first and second apertures, the first and second axially extending surfaces each having a lock edge, a retainer slidable through the pair of apertures in the housing for releasably locking the male and female components together, the retainer including a body having an end wall and first and second spaced side legs extending from the end wall and terminating in outer ends, outwardly extending projections formed on the first and second side legs releasably engageable with the lock edges of the housing after the retainer is fully inserted into the transverse bore in the housing, the release tool comprising:

a collar adapted to be removably mounted on the end of the housing before and after insertion of the male component into the housing;

a pair of opposed arms projecting from the collar and adapted to be engageable with the axially extending surfaces on the housing when the release tool is mounted on the housing; and each of the arms having a retainer engaging surface which is adapted to be engageable with the projections on the retainer upon radially inward movement of the arms to move the projections on the side legs of the retainer radially inward to disengage the projections from the lock edges on the housing allowing movement of the retainer relative to the male component for separation of the male component and the female component.

* * * * *